UNITED STATES PATENT OFFICE.

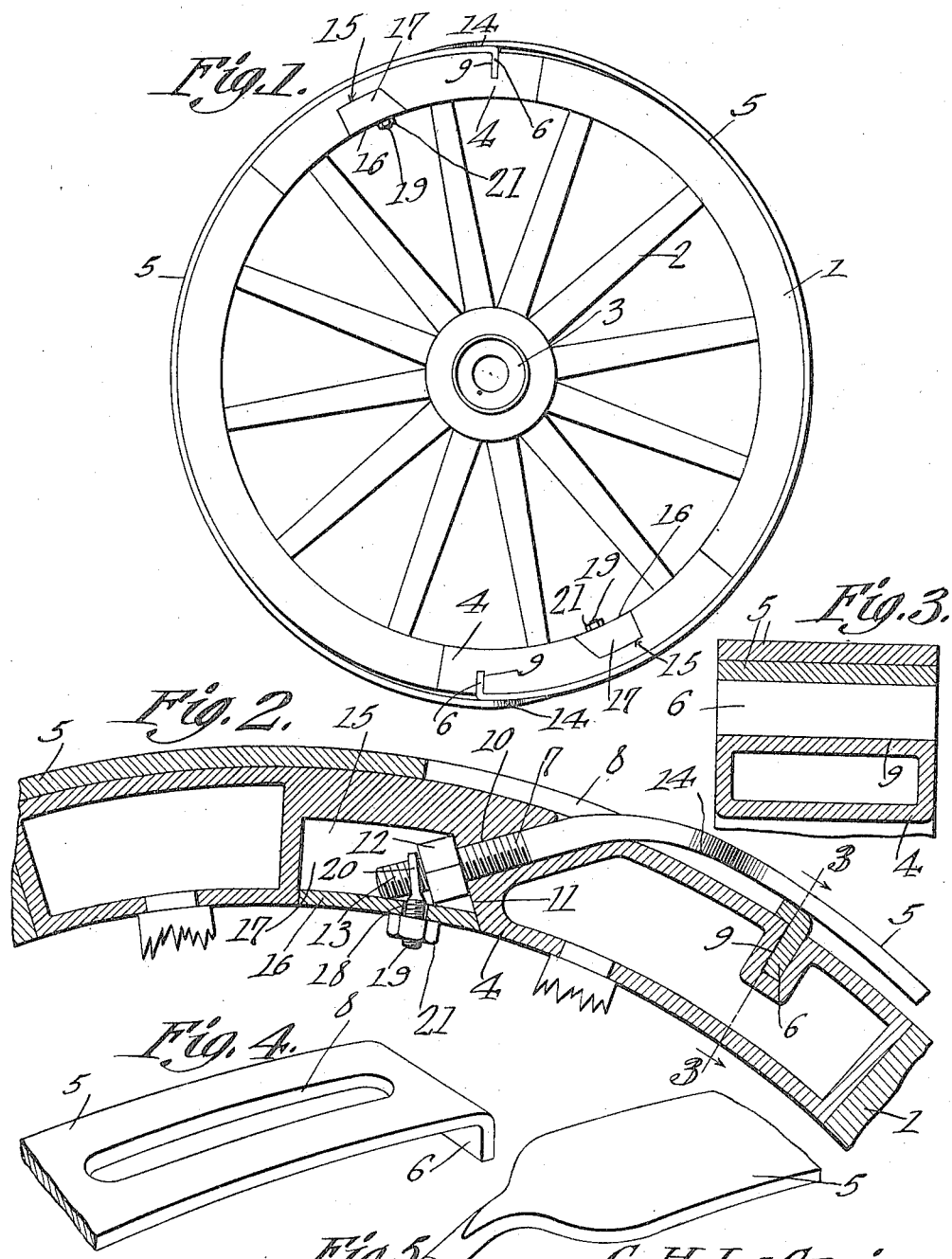

CICERO HAMILTON LA CROIX, OF BANNISTER, TEXAS.

WHEEL.

1,181,017. Specification of Letters Patent. Patented Apr. 25, 1916.

Application filed August 24, 1915. Serial No. 47,095.

*To all whom it may concern:*

Be it known that I, CICERO H. LA CROIX, a citizen of the United States, residing at Bannister, in the county of San Augustine and State of Texas, have invented a new and useful Wheel, of which the following is a specification.

This invention relates to vehicle wheels and more particularly to that type in which separate adjustable tire sections are employed.

An object of this invention is to provide a tire which may be readily applied to its wheel in a cold or unexpanded condition and, also, one that may be adjusted after its application to the wheel, thereby insuring a permanent accurately fitting tire.

Another object of this invention is the provision of a wheel embodying separate tire sections, which are provided with interlocking members adapted to positively obviate any circumferential or lateral movement of the tire with respect to the felly of the wheel.

A further object of this invention is to provide a tire of general improved construction, whereby the device will be simple, durable, and inexpensive in construction, as well as convenient, practical, serviceable, and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiments in the accompanying drawings, wherein:—

Figure 1 is a side elevation of a vehicle wheel showing the improved tire applied thereto. Fig. 2 is a fragmental vertical sectional view taken through the metallic felly section and interlocking members. Fig. 3 is a transverse sectional view taken on the line 3—3 of Fig. 2. Fig. 4 is a fragmental perspective view of the flanged end of one of the tire sections. Fig. 5 is a fragmental perspective view of the opposite end of one of the tire sections.

Referring more particularly to the drawings in which corresponding parts are indicated by similar reference characters, 1 indicates the usual felly of a vehicle wheel, 2 the spokes, and 3 the hub. The felly is cut away at diametrically opposed points for the reception of opposed metallic felly sections 4. These sections are preferably formed of cast steel, although other materials may be employed if found expedient.

The improved tire comprises two complementing semi-circular or arcuate sections 5. Each section 5 has an inwardly extending radial flange or projection 6 formed at one terminal thereof, while a reduced threaded stem 7 extends approximately tangential from the opposed terminal. A longitudinal slot 8 is formed adjacent the flanged terminal of each of the semi-circular sections 5.

The diametrically opposed felly sections 4 have transverse radial slots 9 extending inwardly from the periphery thereof, for the reception of the radial flange 6, while an approximately tangential or oblique aperture 10 extends through the felly section 4. The aperture 10 extends through and terminates at a transverse shoulder 11, which is disposed perpendicularly to the aperture 10.

In assembling the complete improved tire, the radial flanges 6 are inserted into the radial slots 9, after which the reduced stems 7 are extended through the longitudinal recesses 8 and the oblique apertures 10. The tire sections 5 are now secured upon the periphery of wheel felly 1 by simply screwing nuts 12 upon the threaded ends 13 of the stems 7. The nuts 12 will engage the shoulders 11, and any further turning of the nuts 12 upon the stems 7 will draw the sections 5 tightly and rigidly upon the periphery of the felly 1 and securely lock the complete tire thereon.

A recess 15 is formed in each felly section 4, adjacent the shoulders 11, thereby permitting the free movement of the wrench which is employed in rotating the nut 12, and in order to preserve the contour of the felly sections 4 there are provided closures or covers 16 for the recesses 15. The lids or closures 16 are provided with side flanges 17 which accurately engage the inner walls of the recess 15. An aperture 18 is formed in each cover 16 for the reception of an eye bolt 19, the eye 20 of which bolt is placed on the threaded end 13 of the stem 7, while the opposed end of the bolt 19 is threaded for the reception of a nut 21. By screwing the nut against the cover 16, the said cover is rigidly secured to the felly section 4, thereby imparting a neat and symmetrical appearance to the felly sections 4.

The complete improved tire, after being assembled and secured, is prevented from moving or creeping circumferentially around the periphery of the felly 1 by the engagement of the flange 6 with the slot 9 and, also, by the engagement of the stem 7 with the aperture 10. Any lateral movement of the improved tire section 5 with respect to the felly 1, is obviated by the engagement of the side walls of the longitudinal slot 8 with the stem 7. Since the tire sections 5 overlap their flanged terminals 6, as indicated at 14, the flanges 6 are securely held within the slots 9 against radial movement.

It is obvious from the foregoing that this improved tire may be accurately adjusted from time to time after its application to a wheel, to thereby compensate for any shrinkage that may occur in the wheel, and since this tire is applied in its cold or unexpanded condition, a tire much lighter than the usual construction may be advantageously employed.

Having thus described my invention, what is claimed as new is:—

1. A vehicle wheel including a felly; separate tire sections having longitudinal slots formed therein; radial flanges extending from the said sections and into the felly; threaded stems extending obliquely from the said sections and adapted to extend through the longitudinal slots and through the said felly; nuts screwed upon the stems and adapted to secure the said tire sections upon the felly; closures adapted to conceal the said nuts; and means for securing the closures to the felly.

2. A vehicle wheel having portions of its felly cut away for the reception of diametrically opposed felly sections, said felly sections having radial slots extending thereinto; interlocking arcuate tire sections having longitudinal slots formed adjacent one end thereof; radial flanges extending from the slotted ends of the said arcuate tire sections and adapted to engage the said radial slots; and means for adjustably securing the said interlocking tire sections upon the felly of the wheel, said means also adapted to engage the said longitudinal slots.

3. A vehicle wheel having portions of its felly cut away for the reception of opposed felly sections, said felly sections having radial slots and oblique apertures formed therein; transverse shoulders formed on the said felly sections; separate tire sections having longitudinal slots; radial flanges extending from the tire sections and adapted to project into the said radial slots; threaded stems extending from the said tire sections and adapted to extend through the said longitudinal slots and oblique apertures; nuts screwed upon the said stems and adapted to operably engage the said shoulders to secure the tire sections to the felly of the wheel; and means for concealing the said nuts.

4. A vehicle wheel including opposed felly sections having recesses formed therein and oblique apertures extending therethrough; separate tire sections; threaded stems projecting from the tire sections and adapted to extend through the oblique apertures and into the said recesses; nuts screwed upon the said stems and adapted to secure the tire sections to the felly sections; closures for the said recesses; eye bolts extending through the closures and engaging the threaded stems; and nuts screwed upon the eye bolts and adapted to secure the said closures to the felly sections.

In testimony that I claim the foregoing as my own, I have hereto affixed my signature in the presence of two witnesses.

CICERO HAMILTON LA CROIX.

Witnesses:
R. L. CARLILE,
C. H. LA CROIX, Jr.

Copies of this patent may be obtained for five cents each, by addressing the "Commissioner of Patents, Washington, D. C."